UNITED STATES PATENT OFFICE 2,128,025

PRODUCTION OF IMPROVED WAX EMULSIONS

Karl Behringer, Mannheim, Germany, assignor to I. G. Farbenindustrie Aktiengesellschaft, Frankfort-on-the-Main, Germany No Drawing. Application January 16, 1935, Serial No. 2,006. In Germany January 25, 1934

9 Claims. (Cl. 134—1)

The present invention relates to improved non-black wax emulsions and a process of producing same.

Cleansing and polishing agents, such as shoe creams, polishing compositions, coating masses and wood wax stains, are frequently prepared from wax emulsions which contain water alone or in admixture with the usual organic solvents, such as oil of turpentine or benzine. In the case of compositions of the said kind colored with other than black dyestuffs, it is frequently observed that the said dyestuffs are very rapidly destroyed; these preparations and also such preparations as are free from dyestuffs very soon become of poor appearance and incapable of use, especially when stored in metal vessels.

I have now found that non-black wax emulsions which are not attended by the said drawbacks are obtained by incorporating with the wax emulsions during or after their preparation oxygen-containing substances which are not dyestuffs and do not form gum-like products and which are readily reducible by hydrogen at ordinary temperature but which do not oxidize to any considerable extent the constituents of the emulsions under the conditions concerned. Suitable substances of the said kind are, for example, peroxidic compounds, such as hydrogen peroxide, sodium peroxide or benzoyl peroxide, perborates, percarbonates or persulphates, aromatic nitro compounds which are not dyestuffs and especially the water-soluble compounds of this group, such as, for example, the alkali metal salts of nitrobenzoic acids, nitrophthalic acids and nitrobenzene sulphonic acids.

The said substances, when they are soluble in water, are preferably added to the water employed for the preparation of the emulsion; they may, however, be added to the fused wax before its emulsification, especially when they are insoluble in water. The amounts of the said additional substances to be added are very small. Generally speaking 10 grams or less per kilogram of wax emulsion are sufficient; several per cent may also be employed. The invention is not restricted to the addition of special proportions. The wax-preparations to which the said oxygen-containing substances are to be added according to the present invention may be made up in the usual manner and with the usual additions such as solvents, paraffin wax, emulsifying agents, water etc. while using any waxes, for example, carnauba wax, beeswax, Japan wax, vegetable wax, Montan wax, Chinese insect wax, candelilla wax in a crude or purified or bleached state, or any synthetic waxes, or mixtures of all the said waxes.

The following examples will further illustrate the nature of this invention, but the invention is not restricted to these examples.

Example 1

A saponified colored wax emulsion is prepared from the following substances:

| | Kilograms |
|---|---|
| A wax prepared according to Example 4 of the Patent No. 1,834,056 | 6.5 |
| A wax prepared according to Example 2 of the Patent No. 1,834,056 | 3.5 |
| A wax obtainable according to Example 1 of the Patent No. 1,825,248 | 3.0 |
| Colophony | 1.5 |
| Paraffin wax | 8.0 |
| Potassium carbonate | 2.5 |
| Water | 60.0 |
| Metanil Yellow extra (Schultz, Farbstofftabellen 1931, No. 169) | 1.0 |

Before the emulsion is solidified, 1.5 kilograms of sodium perborate dissolved in a little water are added.

The emulsion thus obtained may be employed, for example, as a shoe cream; it does not become discolored even when stored for long periods in metal packings.

Instead of sodium perborate, the same amount of the alkali metal salt of a nitrated phthalic acid may be employed whereby the same effect is obtained.

Example 2

A colored wax emulsion is prepared by mixing and at the same time saponifying the following substances:

| | Kilograms |
|---|---|
| Beeswax | 15 |
| Japan wax | 4 |
| Carnauba wax | 3 |
| Water | 50 |
| Potassium carbonate | 3 |
| Mars Red G (ibid, No. 208) | 1 |
| Oil of turpentine | 15 |

0.5 kilogram of the sodium salt of meta-nitrobenzoic acid is added to the emulsion whereby any undesirable discoloration of the wax mixture, even after storage for long periods in metal vessels, is avoided.

Example 3

A colored wax emulsion (shoe cream) is prepared by mixing and simultaneously saponifying the following mixture:

|  | Kilograms |
|---|---|
| The wax obtainable according to Example 1 of the Patent No. 1,825,248 | 30 |
| The oxidized Montan wax according to Example 4 of the Patent No. 1,777,766 | 6.5 |
| Marseilles soap | 3.5 |
| Water | 150 |
| Sorbin Red (ibid, No. 105) | 2.0 |
| Oil of turpentine | 20 |

1.5 kilograms of benzoyl peroxide are added to the emulsion, which may then be stored in metal vessels without trouble.

Example 4

A colored wax emulsion (wood wax stain), prepared from:

|  | Kilograms |
|---|---|
| A wax obtainable according to Example 4 of the Patent No. 1,834,056 | 20 |
| An oxidized and then esterified Montan wax according to Example 2 of the Patent No. 1,834,056 | 10 |
| Crude Montan wax | 30 |
| Colophony | 15 |
| Spirit | 120 |
| About 20 per cent ammonia | 62 |
| Water | 750 |
| Thiazine Red R (ibid, No. 277) | 7 | has added thereto 5 kilograms of the sodium salt of metanitrobenzene sulphonic acid.

The wax mixture retains its color even after storage for a long period in metal vessels.

Example 5

A wax emulsion (wood wax stain) prepared by mixing:

|  | Kilograms |
|---|---|
| Beeswax | 12 |
| 20 per cent ammonia | 2 |
| Water | 85 |
| Cotton Scarlet (ibid, No. 539) | 1 | has incorporated therewith 0.3 kilogram of the sodium salt of para-nitrobenzoic acid. The wax mixture retains its color unchanged even after storage for a long period in metal vessels.

Example 6

2 kilograms of the potassium salt of para-nitrobenzoic acid are added to a wax emulsion prepared from

|  | Kilograms |
|---|---|
| Candelilla wax | 12 |
| The product obtainable according to Example 1 of the Patent No. 1,825,248 | 3 |
| The product obtainable according to Example 1 of the Patent No. 1,737,975 | 1 |
| Marseilles soap | 1 |
| The condensation product from 1 molecular proportion of oleyl alcohol with about 20 molecular proportions of ethylene oxide | 1 |
| Paraffin wax | 4 |
| Benzine boiling from 130° to 180° C | 38 |
| Water | 30 |

The emulsion thus obtained may be stored for a long period in metal vessels without any undesired change.

Example 7

1.5 kilograms of the potassium salt of nitrophthalic acid are added to a paste prepared from

|  | Kilograms |
|---|---|
| A product obtainable according to Example 1 of Patent No. 1,825,248 which product has been bleached by means of about 30 per cent of chromic acid in sulphuric acid solution | 12 |
| A product obtainable according to Example 4 of Patent No. 1,834,056 | 3 |
| Marseilles soap | 1 |
| Slightly yellow carnauba wax | 4 |
| Paraffin wax | 4 |
| Oil of turpentine | 37 |
| Water | 37 |

The product is a good polishing agent, for example, it may be employed as a floor polish, as a motor-car polish or as a furniture-polish.

It may be stored, even for long periods, for example, in tin plate packings, without trouble and without formation of rust.

What I claim is:—

1. The process of producing stable wax emulsions which are free from black dyestuffs, which comprises incorporating in an aqueous emulsion of a saponifiable wax which becomes discolored upon storage in metal containers, an oxygen-containing practically colorless substance which is readily reducible by hydrogen at ordinary temperature and which is selected from the class consisting of peroxides, perborates, percarbonates, persulfates, and the alkali metal salts of nitrobenzoic acids, nitrophthalic acids and nitrobenzene sulphonic acids which are not dyestuffs, in an amount such that said discoloration is precluded.

2. The process of producing stable wax emulsions which are free from black dyestuffs, which comprises incorporating in an aqueous emulsion of a saponifiable wax which becomes discolored upon storage in metal containers, during preparation of said emulsion, an oxygen-containing practically colorless substance which is readily reducible by hydrogen at ordinary temperature and which is selected from the class consisting of peroxides, perborates, percarbonates, persulfates, and the alkali metal salts of nitrobenzoic acids, nitrophthalic acids and nitrobenzene sulphonic acids which are not dyestuffs, in an amount such that said discoloration is precluded.

3. The process as defined in claim 1, wherein said oxygen-containing substance is added in an amount of up to 1% by weight of said emulsions.

4. The process as defined in claim 1, wherein said oxygen-containing substance is a peroxide.

5. The process as defined in claim 1, wherein said oxygen-containing substance is an alkali metal salt of a nitrobenzoic acid.

6. Storage stable aqueous emulsions of saponifiable waxes free from black dyestuffs, which emulsions are normally discolorable upon storage in metal containers but which contain an oxygen-containing practically colorless substance which is readily reducible by hydrogen at ordinary temperature and is selected from the class consisting of peroxides, perborates, percarbonates, persulfates, and the alkali metal salts of nitrobenzoic acids, nitrophthalic acids and nitrobenzene sulphonic acids which are not dyestuffs, in an amount such that said discoloration is precluded.

7. The compostion defined in claim 6, wherein said oxygen-containing substance is present in an amount of up to 1% by weight of the emulsion.

8. The composition as defined in claim 6, wherein said oxygen-containing substance is a peroxide.

9. The composition as defined in claim 6, wherein said oxygen-containing substance is an alkali metal salt of a nitrobenzoic acid.

KARL BEHRINGER.